Patented Dec. 9, 1930

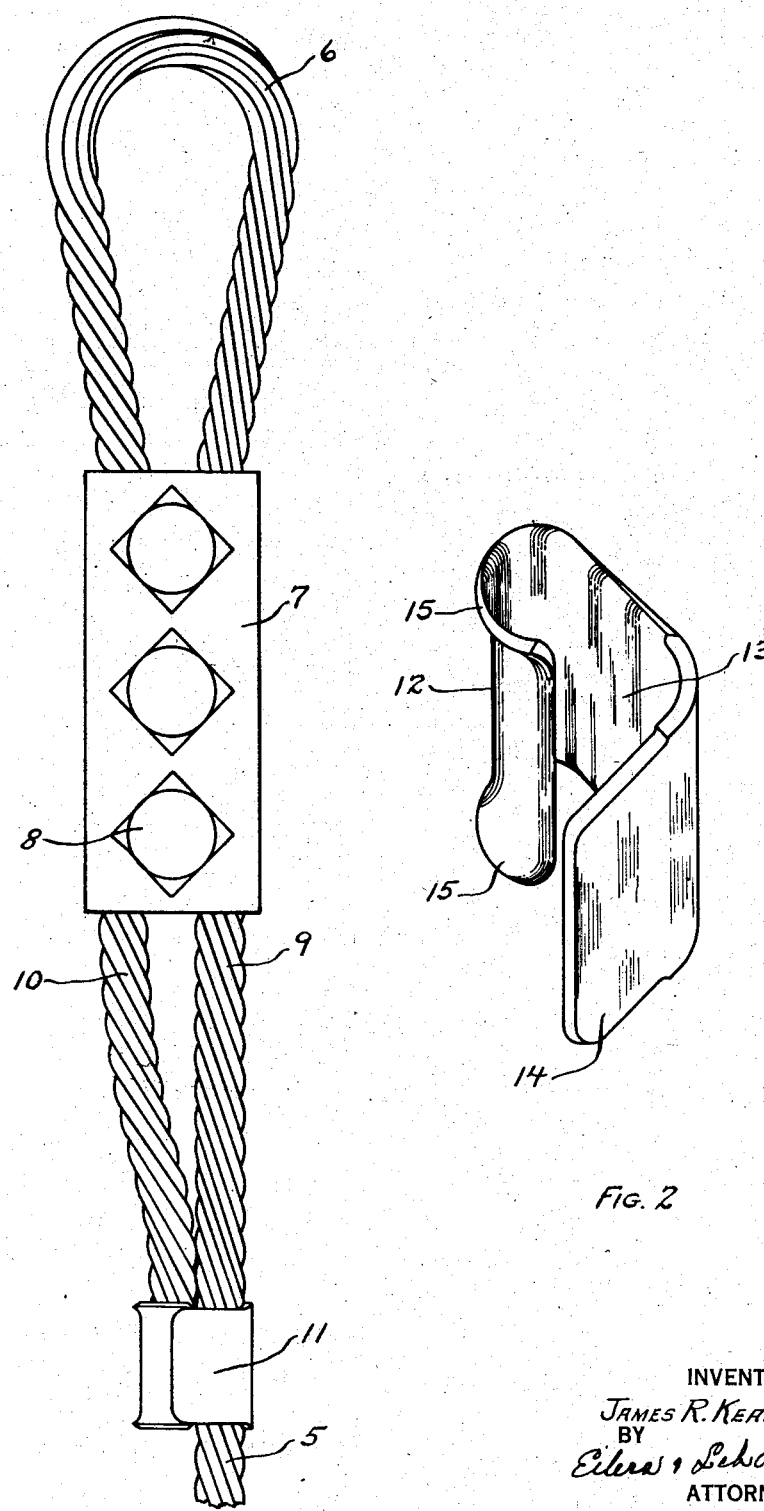

1,783,967

UNITED STATES PATENT OFFICE

JAMES R. KEARNEY, OF ST. LOUIS, MISSOURI

GUY CLIP

Application filed September 9, 1927. Serial No. 218,482.

This invention relates to fastening means for cables, and particularly to an improved fastening clip adapted for use as a substitute for the prevailing practice of serving or mousing the dead ends of guy cables and the like.

The customary practice upon dead-ending or forming a permanent loop in a guy cable, or the like, is to form and position the loop by means of a clamp of some sort, such as the standard guy clamp now in use in connection with overhead line work. The dead end of the cable is not usually severed beyond the clamp, but is customarily positioned next and parallel to the main strand of the cable by means of serving or mousing the dead end. This practice consists in wrapping several turns of a comparatively small wire around the parallel cables. It is the immediate and specific purpose of this invention to create a small, inexpensive, and permanent clip to serve as a substitute for the present unsatisfactory process of serving the dead end.

In general, an object of this invention is to obtain a quickly attachable fastening device for securing together a plurality of cables, ropes, or the like, and which is especially adapted for maintaining adjacent cables or ropes substantially parallel to each other.

A further object is to provide a fastening of the type mentioned, which is capable of ready attachment or removal in a single operation, without special tools.

A still further object is to provide a device of the class mentioned, which is adapted to serve cables of a variety of sizes, and which may be used for securing together pairs or groups of cables or lines of somewhat different sizes.

A still further object is the creation of a device for the purpose described, which will reduce materially the cost of serving or mousing cables according to the present methods, by effecting a saving in time required for the purpose.

Further objects and advantages of the invention will appear from the drawings, and the following detailed description.

It will be understood that the described and illustrated arrangement, shape, and disposition of the various parts of the cable clip, and the suggested method of securing together the ends thereof, as well as the suggested uses of the article described, may be varied substantially without departure from the spirit and full intention of this invention; the subject matter herein set forth constituting merely a single executional embodiment of the invention, which is submitted in compliance with the statutory requirements relating to applications for Letters Patent.

In the drawings, Fig. 1 is an elevation of a fastening end of a stranded cable, such as is commonly used for guy cable and overhead line construction, showing the usual guy clamp, and my preferred form of guy clip securing together the dead end and the main strand. Fig. 2 is an enlarged view in perspective of a preferred form of my cable clip, showing a suggested disposal of parts of the clip before securing it about the cables.

Referring by numerals to the drawings, 5 indicates a stranded cable of the sort ordinarily used as guy cable in overhead line construction. The cable 5 is bent on itself at 6 to form a fastening end. At this point an eye may be inserted, or the fastening end may engage a hook, strain insulator, or other device. The fastening end 6 is shaped and positioned by means of a guy clamp 7, of any conventional type. This may consist of a pair of the usual plates, one on each side of the stranded cables, the plates being positioned and frictionally retained by means of bolts or studs 8, as shown.

In the double cable assembly as shown, 9 indicates the main strand, and 10 the portion ordinarily designated as the dead end. In lieu of the usual practice of serving the dead end by wiring it into position next to the main strand, I employ the guy clip indicated generally as 11. This clip may be formed af aluminum, galvanized iron, copper or other material of suitable gauge and stiffness. The details of the clip may be readily ascertained from Fig. 2 of the drawings, in which it will be seen that I preferably provide a semi-cylindrical portion 12 adapted to receive and engage one of the cables, either the main strand or the dead end. The portion 12 is connected with a flat portion 13, which forms a plane side of the clip adapted to rest against one side of each of the pair or more of strands to be positioned by the clip. The flat portion 13 is bent upwardly to form an overlapping lip 14. The lip 14 is somewhat restricted in width, as compared to the remainder of the band forming the clip. The semi-cylindrical portion 12, and if preferred the flat portion 13, may be provided with outwardly turned marginal flanges 15. The purpose of the flanges 15 is to retain and laterally position the lip 14, as well as to prevent the raw edge of the clip from coming in contact with the cable.

The clip may be almost instantly attached for dead ending a cable by inserting the portion 12 over the dead end 10 as shown. With a pair of pliers or a tool ordinarily available to a lineman the lip 14 is bent over the pair of cables, so that the lip 14 falls between the marginal flanges 15 and preferably overlaps the portion 12. The inherent rigidity and stiffness of the band material forming the clip, is entirely sufficient to maintain the clip by friction on the cable, and as well, to position a pair or more of the cables in their predetermined relation.

The advantages of the described clip over the usual practice of mousing the dead ends of cables will be readily apparent to those familiar with the amount of time required, and the unsatisfactory results obtained with the former practice.

It will be seen that the cable clip as described will be well adapted for replacement use, as well as on original installations. It will also be observed from the drawings, that the described device may be used to serve the end of a single rope or cable, to prevent separation of the strands. The described device not only serves its purpose better and more cheaply than existing methods, but makes for greater neatness in appearance of the finished fastening end.

I claim as my invention:

1. A flexible cable clip having a side opening, and adapted to engage a doubled cable; said clip having a substantially semi-circular portion, and a substantially rectilinear portion adapted to be bent into adjacence with the semi-circular portion to close the clip about the doubled cable.

2. In a cable clip having ends adapted to be overlapped, projections formed on marginal portions of the clip, at an angle to the body of the clip, and adapted for preventing the lateral displacement of the overlapped ends.

3. A cable clip having upstanding marginal flanges on a portion thereof and adapted to have one end disposed on said portion between the flanges.

4. A cable clip adapted for serving a dead end, comprising a sheet metal member having upturned marginal flanges, a hook portion adapted to receive the cable and its dead end, and an end portion adapted to be bent into engagement with the hook portion to overlie the clip body in parallel adjacence thereto between the flanges, and arranged, after bending, to coact with said flanges to secure the clip to the cable.

5. A sheet metal clamp for parallel cables, comprising a cable receiving portion, upstanding portions on opposite margins of the clamp, and a flexible end portion adapted to be bent to extend between said upstanding portions and conformed to the cables; said receiving portion being of hook form, and the flexible portion being of substantially rectilinear form and angulately disposed relative to the hook portion.

6. A sheet metal clamp adapted to fasten together a pair of cables, the clamp having a portion adapted to receive the cables and support the clamp thereon, an end portion adapted to be bent about one cable to overlie the first named portion, upstanding projections formed on the clamp adapted to engage said end portion, whereby the clamp is kept closed upon itself, and the cables are positioned relative to each other.

7. In a metallic band adapted to serve the dead end of a cable, a portion having marginal projections, and another portion adapted to overlap the first named portion and be seated between the projections.

8. A sheet metal end clip for a rope or cable, comprising end portions adapted to be overlapped, around the cable, to form a doubled securing portion, and upstanding, spaced portions, preformed on the clip, and adapted to align the end portions relative to each other.

9. A sheet metal clip adapted to be wrapped about a pair of cables and positioned thereon by the engagement of one of its end portions with the other end portion; the one end portion having marginal flanges thereon, and the other end portion being restricted in width and adapted to be engaged by said flanges.

10. A metal clip formed to be wrapped about a pair of parallel cables, one of the end portions of the clip being adapted to seat upon the other end portion, and locking means constituted by preformed parts of each of said end portions, and adapted to lock the end portions to each other and to secure the band around the cables.

JAMES R. KEARNEY.